(12) United States Patent
Lorenz

(10) Patent No.: US 10,663,012 B2
(45) Date of Patent: May 26, 2020

(54) CLUTCH DEVICE FOR A HYBRID DRIVE SYSTEM

(71) Applicant: Schaeffler Technologies AG & Co. KG, Herzogenaurach (DE)

(72) Inventor: Elmar Lorenz, Rheinmünster Söllingen (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 136 days.

(21) Appl. No.: 15/750,336

(22) PCT Filed: Jul. 18, 2016

(86) PCT No.: PCT/DE2016/200326
§ 371 (c)(1),
(2) Date: Feb. 5, 2018

(87) PCT Pub. No.: WO2017/028850
PCT Pub. Date: Feb. 23, 2017

(65) Prior Publication Data
US 2018/0231067 A1    Aug. 16, 2018

(30) Foreign Application Priority Data
Aug. 20, 2015   (DE) .................. 10 2015 215 900

(51) Int. Cl.
*F16D 21/06*    (2006.01)
*F16D 25/0638*    (2006.01)
(Continued)

(52) U.S. Cl.
CPC .............. *F16D 21/06* (2013.01); *B60K 6/387* (2013.01); *F16D 25/0638* (2013.01);
(Continued)

(58) Field of Classification Search
CPC .............. F16D 21/06; F16D 2021/0661; F16D 2021/0669; F16D 25/0638; F16D 25/082; F16D 25/10
See application file for complete search history.

(56) References Cited

U.S. PATENT DOCUMENTS 2,993,576 A    7/1961    Carlin et al.
6,929,107 B2 *    8/2005    Hegerath ................ F16D 21/06
192/106 F
(Continued)

FOREIGN PATENT DOCUMENTS

CN    101270786 A    9/2008
CN    101761590 A    6/2010
(Continued)

OTHER PUBLICATIONS

International Search Report for PCT/DE2016/200326; 3 pgs; dated Oct. 14, 2016 by European Patent Office.

*Primary Examiner* — David R Morris
(74) *Attorney, Agent, or Firm* — Kevin L. Parks

(57) ABSTRACT

A clutch device includes a first and a second input side as well as a first and a second output side. The input sides and the output sides can be rotated about a common axis of rotation. The clutch device furthermore includes a first clutch between the first input side and the first output side and a second clutch between the first input side and the second output side. A third clutch may be provided between the first input side and the second input side. A first hydraulic actuating device is associated with the first clutch, a second hydraulic actuating device is associated with the second clutch, and a third hydraulic actuating device is associated with the third clutch. A radial flange, which receives an axial actuating force of one of the actuating devices, includes a radially extending feed for hydraulic fluid to one of the actuating devices.

19 Claims, 5 Drawing Sheets

(51) Int. Cl.
  *F16D 25/08* (2006.01)
  *F16D 25/10* (2006.01)
  *B60K 6/387* (2007.10)
  *H02K 7/00* (2006.01)
  *H02K 7/108* (2006.01)

(52) U.S. Cl.
  CPC .......... *F16D 25/082* (2013.01); *F16D 25/10* (2013.01); *H02K 7/006* (2013.01); *H02K 7/108* (2013.01); *B60Y 2200/92* (2013.01); *F16D 2021/0607* (2013.01); *F16D 2021/0615* (2013.01); *F16D 2021/0661* (2013.01); *F16D 2021/0669* (2013.01); *Y10S 903/914* (2013.01)

(56) References Cited

U.S. PATENT DOCUMENTS

| | | | | |
|---|---|---|---|---|
| 7,485,061 B2 * | 2/2009 | Reisch | ............... | B60K 6/387 475/5 |
| 7,489,114 B2 * | 2/2009 | Nomura | ............... | B60K 6/26 322/33 |
| 7,631,739 B2 * | 12/2009 | Enstrom | ............... | B60K 6/387 192/113.34 |
| 8,333,272 B2 * | 12/2012 | Wheals | ............... | F16D 13/72 192/113.31 |
| 8,453,817 B2 * | 6/2013 | Schrage | ............... | B60K 6/26 192/48.611 |
| 8,844,697 B2 * | 9/2014 | Wheals | ............... | F16D 13/72 192/70.12 |
| 9,950,605 B2 * | 4/2018 | Suyama | ............... | B60K 6/387 |
| 2004/0206599 A1 * | 10/2004 | Hegerath | ............... | F16D 21/06 192/48.611 |
| 2007/0049445 A1 * | 3/2007 | Reisch | ............... | B60K 6/387 475/5 |
| 2007/0089962 A1 * | 4/2007 | Enstrom | ............... | B60K 6/387 192/48.614 |
| 2008/0093135 A1 * | 4/2008 | Nomura | ............... | B60K 6/26 180/65.24 |
| 2010/0044178 A1 * | 2/2010 | Wheals | ............... | F16D 13/72 192/48.8 |
| 2010/0326785 A1 * | 12/2010 | Schrage | ............... | B60K 6/26 192/70.12 |
| 2013/0146416 A1 * | 6/2013 | Wheals | ............... | F16D 13/72 192/113.1 |
| 2017/0203643 A1 * | 7/2017 | Suyama | ............... | B60K 6/387 |
| 2018/0231066 A1 * | 8/2018 | Lorenz | ............... | F16D 21/06 |
| 2018/0236865 A1 * | 8/2018 | Lorenz | ............... | B60K 6/387 |
| 2018/0238401 A1 * | 8/2018 | Lorenz | ............... | F16D 25/10 |
| 2018/0245640 A1 * | 8/2018 | Lorenz | ............... | F16D 21/06 |
| 2018/0283469 A1 * | 10/2018 | Lorenz | ............... | F16D 21/06 |

FOREIGN PATENT DOCUMENTS

| | | | | |
|---|---|---|---|---|
| CN | 103775533 A | 5/2014 | | |
| CN | 104097499 A | 10/2014 | | |
| DE | 102007003107 A1 | 8/2007 | | |
| DE | 102009052064 A1 | 7/2010 | | |
| DE | 102009059944 A1 | 7/2010 | | |
| DE | 102011100256 A1 * | 10/2012 | ............. | B60K 6/387 |
| DE | 112012001033 T5 | 12/2013 | | |
| EP | 1195537 A1 | 4/2002 | | |
| GB | 2442877 A | 4/2008 | | |

* cited by examiner

CLUTCH DEVICE FOR A HYBRID DRIVE SYSTEM

CROSS-REFERENCE TO RELATED APPLICATIONS

This application is the United States National Phase of PCT Appln. No. PCT/DE2016/200326 filed Jul. 18, 2016, which claims priority to German Application No. DE102015215900.0 filed Aug. 20, 2015, the entire disclosures of which are incorporated by reference herein.

TECHNICAL FIELD

The present disclosure relates to a clutch device. In particular, the present disclosure relates to a clutch device for a hybrid drive.

BACKGROUND

A motor vehicle has a first drive motor, which is embodied as an electric machine, and a second drive motor, which is embodied as an internal combustion engine. The motor vehicle can be driven in a hybrid manner, i.e. in any desired combination of the first and/or second drive motor. For this purpose, a clutch device is provided between the drive motors and a transmission of the motor vehicle.

DE 10 2009 059 944 A1 relates to a clutch device for a motor vehicle that can be driven in a hybrid manner.

BRIEF SUMMARY

The present disclosure describes a clutch device which can be used in a hybrid drive. In particular, the disclosed device describes a routing of a hydraulic feed line to an actuating device for actuating one of the clutches.

A clutch device includes a first and a second input side as well as a first and a second output side, wherein the input sides and the output sides can be rotated about a common axis of rotation. The clutch device furthermore includes a first clutch between the first input side and the first output side and a second clutch between the first input side and the second output side. In addition, a third clutch is provided between the first input side and the second input side. A first hydraulic actuating device is associated with the first clutch, a second hydraulic actuating device is associated with the second clutch, and a third hydraulic actuating device is associated with the third clutch. A radial flange, which receives an axial actuating force of one of the actuating devices, includes a radially extending feed for hydraulic fluid to one of the actuating devices.

The first and the second clutch can be offset radially relative to one another. However, another possibility is to arrange the first and the second clutch in such a way that they are offset axially.

The flange can include mutually separate, radially extending feeds for hydraulic fluid to different actuating devices, in particular to the first and second actuating device.

The feed can extend radially outward or radially inward from the actuating device.

One of the output sides can include a shaft having a coaxial hole, wherein the feed, for example, opens into the hole.

The feed can be closed on a radial outer side by a closure body, which rests radially on an electric machine. The electric machine can be mounted radially to the outside of the first input side. A further means of securing the closure body may then no longer be required. Assembly or disassembly of the clutch device can thereby be simplified.

All three clutches are, for example, arranged in a common housing, which is partially filled with a liquid medium. In particular, the liquid medium can comprise an oil or a hydraulic fluid. If one of the actuating devices is hydraulic, a working medium of the actuating device can comprise the same fluid as the medium.

The first input side is, for example, designed for connection to a rotor of an electric machine. The rotor is, for example, surrounded radially on the outside by a stator of the electric machine. The second input side is, for example, designed for connection to an output shaft of a combustion engine.

BRIEF DESCRIPTION OF THE DRAWINGS

The present disclosure is now described in greater detail with reference to the attached figures, in which.

DETAILED DESCRIPTION

Figure 1:
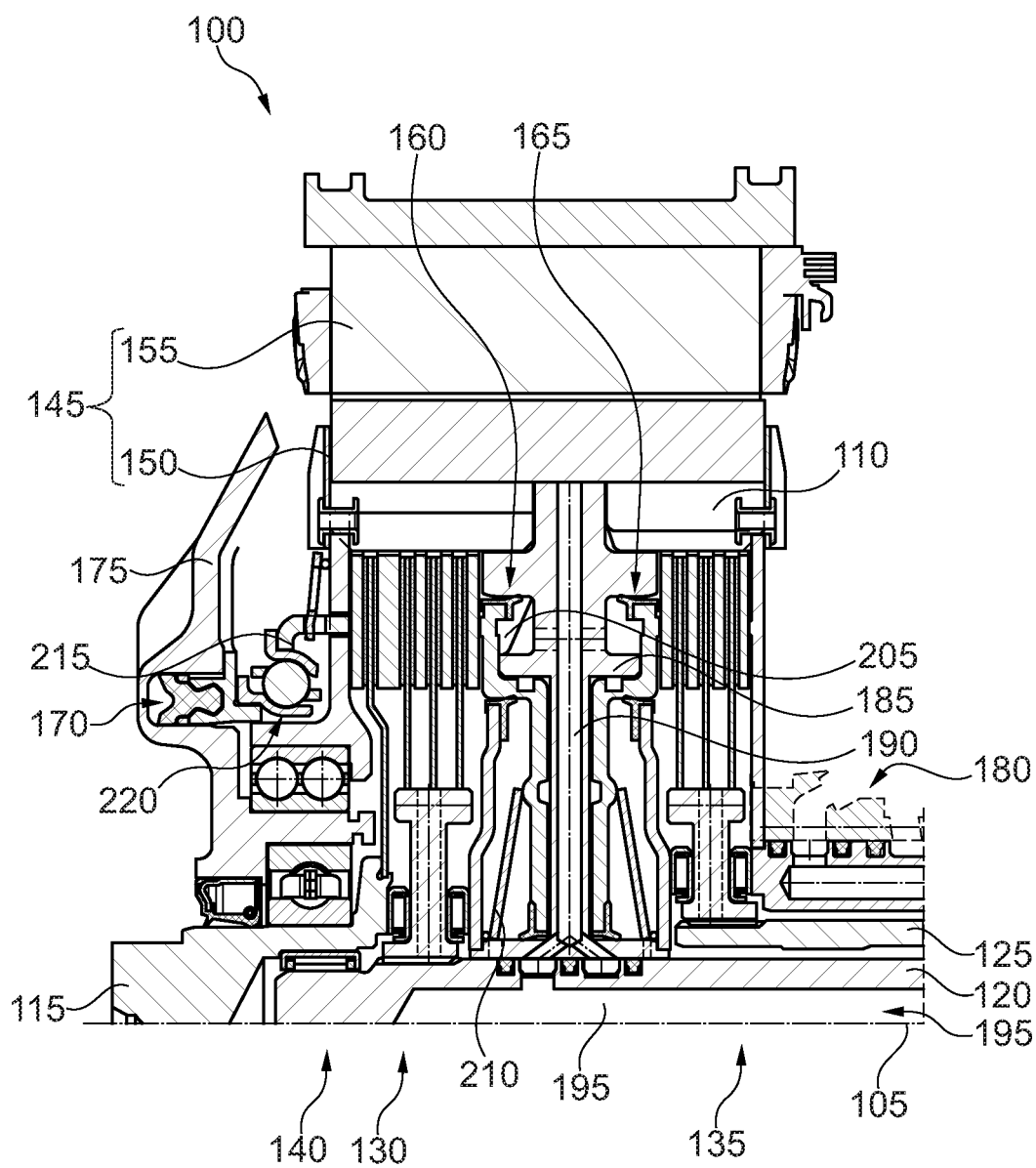
FIG. 1 shows an illustrative clutch device in a first embodiment.

FIG. 1 shows an illustrative clutch device 100. A first input side 110, a second input side 115, a first output side 120 and a second output side 125 are arranged around an axis of rotation 105.

A first clutch 130 is situated between the first input side 110 and the first output side 120, a second clutch 135 is situated between the first input side 110 and the second output side 125 and an optional third clutch 140 is situated between the first input side 110 and the second input side 115. The first two clutches 130 and 135 are arranged radially or, for example, axially offset relative to one another and form an axial dual clutch. The third clutch 140 is, for example, offset axially relative to at least one of the two other clutches 130 and 135.

The first input side 110 is designed for connection to an electric machine 145, which generally includes a rotor 150 and a stator 155. The electric machine 145 is, for example, of the internal-rotor type, wherein the rotor 150 is situated radially to the inside of the stator 155. Stator 155 may have at least one solenoid and the rotor 150 may have at least one permanent magnet. The rotor 150 is, for example, situated radially to the outside of clutches 130, 135 and 140 and, in the embodiment illustrated, is connected to the first input side 110 by means of rivets. The second input side 115 is, for example, designed for connection to a combustion engine, in particular an internal combustion engine, for example, a reciprocating piston engine.

The output sides 120 and 125 are designed for connection to input shafts of a dual transmission (not shown). The dual transmission is usually designed to couple each of the input shafts to a common output shaft by means of a different gearwheel pair. If the drive train is arranged in a motor vehicle, the output shaft can ultimately act on a driven wheel of the motor vehicle. In order to select a gear stage, one of the clutches 130 or 135 is generally closed, while the other clutch 130, 135 in each case is opened. The dual transmission, for example, includes a plurality of gearwheel pairs on each transmission shaft, each of said pairs forming one gear stage. One gearwheel pair can usually be engaged or disengaged when it is connected to an output shaft 120, 125, the associated clutch 130, 135 of which is open at that particular time.

In particular, the clutch device 100 is designed to be used in the drive train of a motor vehicle. In this case, the motor vehicle can, for example, be driven in a hybrid manner, i.e. alternatively by the internal combustion engine, by the electric machine 145 or by both drive motors. If the internal combustion engine is to be used, the third clutch 140 is closed. If the electric machine 145 is to be used, it is usually controlled electrically in such a way that torque can be converted. Both drive motors can introduce both positive and negative torque into the drive train. The electric machine 145 can also absorb kinetic energy from the drive train and convert it into electric energy, which can be stored temporarily in an energy storage device, for example. By virtue of its compact construction, the clutch device 100 is suitable especially for transverse installation at the front of a motor vehicle.

The first clutch 130 is assigned a first actuating device 160, the second clutch 135 is assigned a second actuating device 165 and the third clutch 140 is assigned a third actuating device 170. All three actuating devices 160, 165 and 170, for example, operate hydraulically and are each designed to exert an axial actuating force on one of the clutches 130, 135 and 140, with the result that friction elements of the clutches 130, 135 or 140 are pressed axially against one another in order to produce frictional engagement and to transmit a torque between the friction elements. The friction elements are each, for example, pressed together between the associated actuating device 160, 165, 170 and an axial abutment. The hydraulic actuating devices 160, 165 and 170 can be individually controlled in an active manner, e.g. by selectively admitting or discharging a pressurized medium into and out of a hydraulic working space of the respective actuating device 160, 165 or 170 by means of a valve or a pump. As an alternative, it is also possible to provide actuation under the control of oil subject to a centrifugal action, for example.

The three clutches 130, 135 and 140 are, for example, arranged in a common housing 175, which can be at least partially filled with a liquid medium 180, in particular an oil. The medium 180 can also be used as the working medium (hydraulic fluid) of one of the actuating devices 160, 165 and 170. The clutches 130, 135 and 140 are, for example, each of the wet type and can be designed independently of one another as single-disk or multi-disk clutches. The first clutch 130 and the second clutch 135 can be of the multi-disk type in order to allow sensitive opening and closing of the torque flow through the clutches 130, 135. The third clutch 140 can also be of the single-disk type, as illustrated, wherein the third clutch 140 can be designed as a selector clutch, which is as far as possible not operated subject to slip.

In the embodiment illustrated, there is a radial flange 185 axially between the first clutch 130 and the second clutch 135 as an abutment, against which the clutches 130, 135 can be pressed by means of the respectively associated actuating device 160, 165. Actuating forces of the actuating devices 160, 165, 170 are, for example, supported within the clutch device 100, and therefore no resultant forces have to be supported with respect to the outside.

If the clutch 100 is to be used in a drive train without the electric machine 145, it is also possible for the third clutch 140 to be omitted. The first input side 110 and the second input side 115 then coincide.

In the embodiment illustrated, the three clutches 130, 135 and 140 are arranged axially, although, in other embodiments, it is also possible, for example, to choose a radial arrangement of the first clutch 130 and of the second clutch 135. In the axial mode of construction shown, the radial flange 185 is, for example, situated axially between clutches 130 and 135.

It is proposed that the flange 185 comprise a radially extending feed 190 for a hydraulic fluid 180, which, in particular, can correspond to the medium 180. In the embodiment illustrated, a feed 190 extends radially completely through the flange 185. On a radially outer side, the feed 190 is closed by the rotor 150 of the electric machine 145; in another embodiment, however, this closure can also be provided by the first input side 110. On the radial inner side, the feed 190 opens into a region in which a radial hole in the first output side 120 leads into a coaxial hole 195 on the first output side 120. Here, the first output side 120 is, for example, embodied as a hollow shaft and the hole 195, for example, extends concentrically with the axis of rotation 105.

Arranged in a radially central region of the flange 185 is the first actuating device 160, which includes a hydraulic working space 205, which is connected to the feed 190 by means of an axial hole, for example. In the embodiment shown, it is thus possible overall for the actuating device 160 to be activated by introducing pressurized fluid 190 axially into the first output side 120. Resetting of the first actuating device 160 is, for example, accomplished by means of an elastic element 210, which, in particular, can be designed as a diaphragm spring.

In the embodiment illustrated, a hydraulic piston of the first actuating device 160 extends radially inward into the region of the first output side 120. To prevent fluid 180 which is being forced radially outward by the effect of rotational speed from accidentally opening the first actuating device 160, example embodiments provide a means of compensating for oil that is subject to a centrifugal action by directing fluid 180 that is present outside the working space 205 and is subject to the same effect of rotational speed onto the outer side of the piston.

As illustrated in FIG. 1, the second actuating device 165 can be supplied with hydraulic fluid in the same way. The second actuating device 165 is constructed in mirror symmetry with the first actuating device 160, and the feed lines to the second actuating device 165, for example, likewise extend in mirror symmetry with those of the first actuating device 160. The flange 185, for example, has another feed 190, which extends separately from the feed 190 for the first actuating device 160. At a radially inner end, openings of the two feeds 190 are, for example, axially offset. If fluid 180 is transferred to the feeds 190 through a shaft, in particular the first output side 120, the shaft has holes for this purpose, said holes, for example, being separate. One of the feeds can also end in an axially extending annular gap between two concentric shafts, in particular of output sides 120 and 125.

In the embodiment illustrated, the third actuating device 170 is arranged in a manner integrated into a part of the housing 175. In this arrangement, a hydraulic feed generally does not extend through the region of the flange 185. Here, an actuating force on the third clutch 140 is transmitted by means of an actuating element 215, and a rotary motion between the third actuating device 170 and the third clutch 140 is decoupled by means of a rolling bearing 220, for example.

Figure 2:
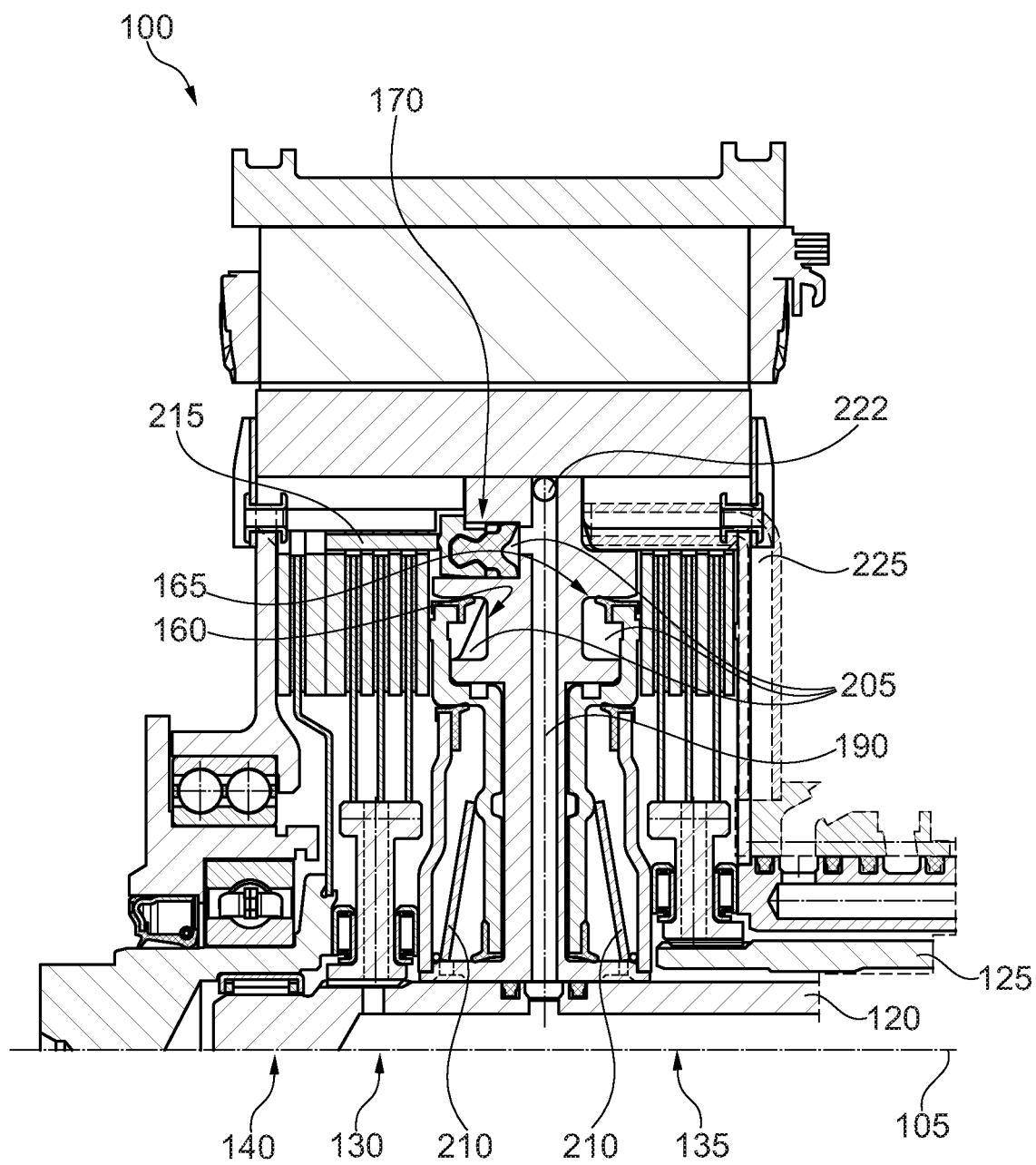
FIG. 2 shows the clutch device of FIG. 1 in an alternative embodiment.

FIG. 2 shows another embodiment of the clutch device 100 in FIG. 1. The embodiment illustrated here differs from that in FIG. 1 primarily in that the third actuating device 170 is arranged in the region of the flange 185. The three actuating devices 160, 165 and 170 are, for example, embodied in a manner integrated with the flange 185 inasmuch as the flange 185 provides axial depressions which delimit the hydraulic working spaces 205 and are closed off by means of the associated hydraulic pistons. Here, the actuating element 215 for the third clutch 140 extends in the axial direction on the radially outer side of the first clutch 130.

In the embodiment illustrated, the feed 190 is closed on the radial outer side by means of a closure body 222, which is here embodied as a ball. The closure body 222 is, for example, secured by the rotor 150 of the electric machine 145, which rests against it radially on the outside.

The feeds 190 to the first two actuating devices 160 and 165, for example, extend radially outward in the flange 185, rather than inward, and, for example, open into mutually separate lines 225, of which only one is shown in FIG. 2. In this arrangement, by way of example, the lines 225 extend in the axial direction radially to the outside of the second clutch 135.

Figure 3:
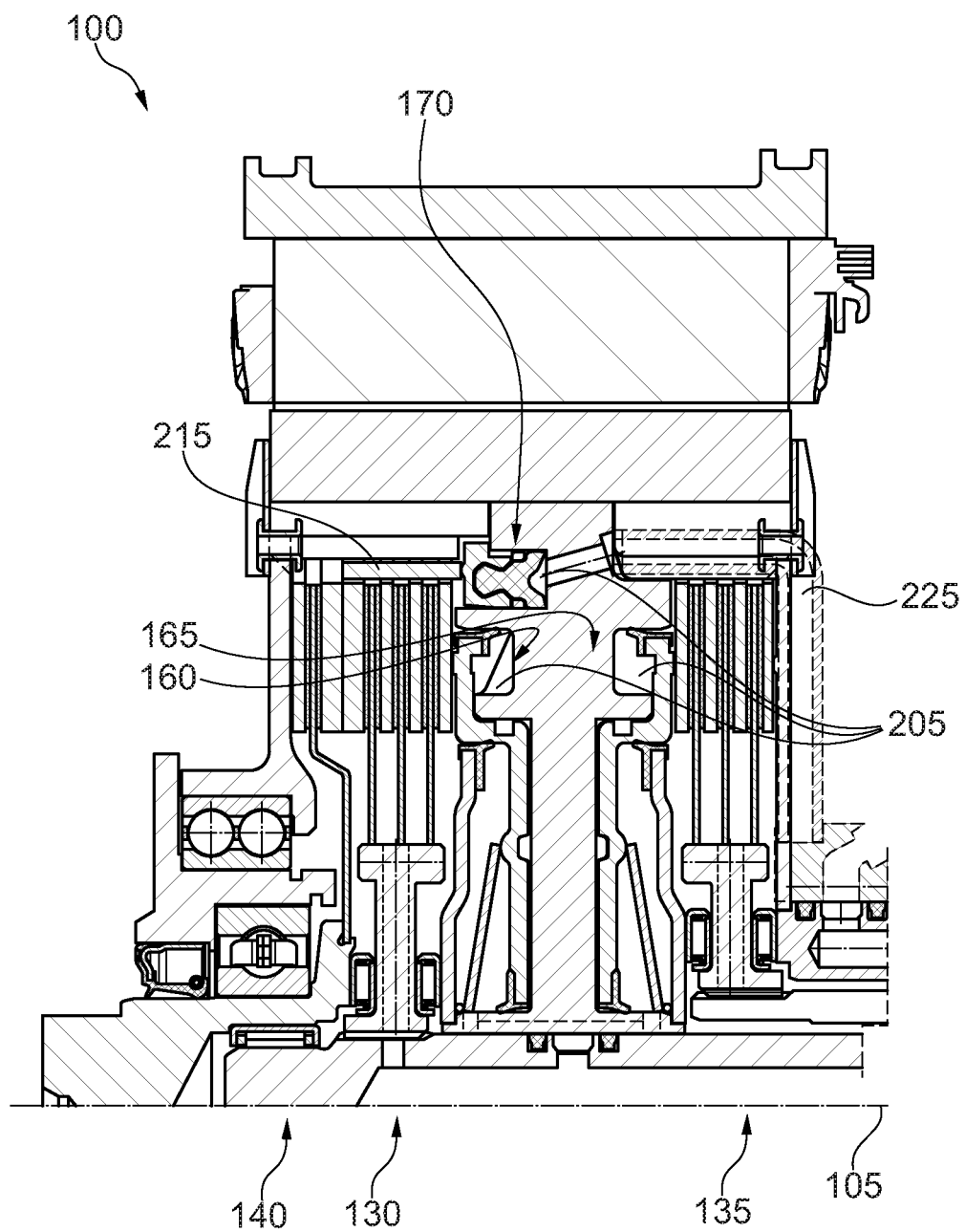
FIG. 3 shows the clutch device of FIG. 1 in an alternative embodiment.

FIG. 3 shows another embodiment of the clutch device 100 in FIG. 1. In contrast to the embodiment shown in FIG. 2, the feed through the flange 185 on the radial outer side of the second clutch 135 is accomplished by means of the line 225. As an alternative, feeds 190 for the actuating devices 160 and 165 can be routed radially inward (cf. FIG. 1) or radially outward (cf. FIG. 2).

Figure 4:
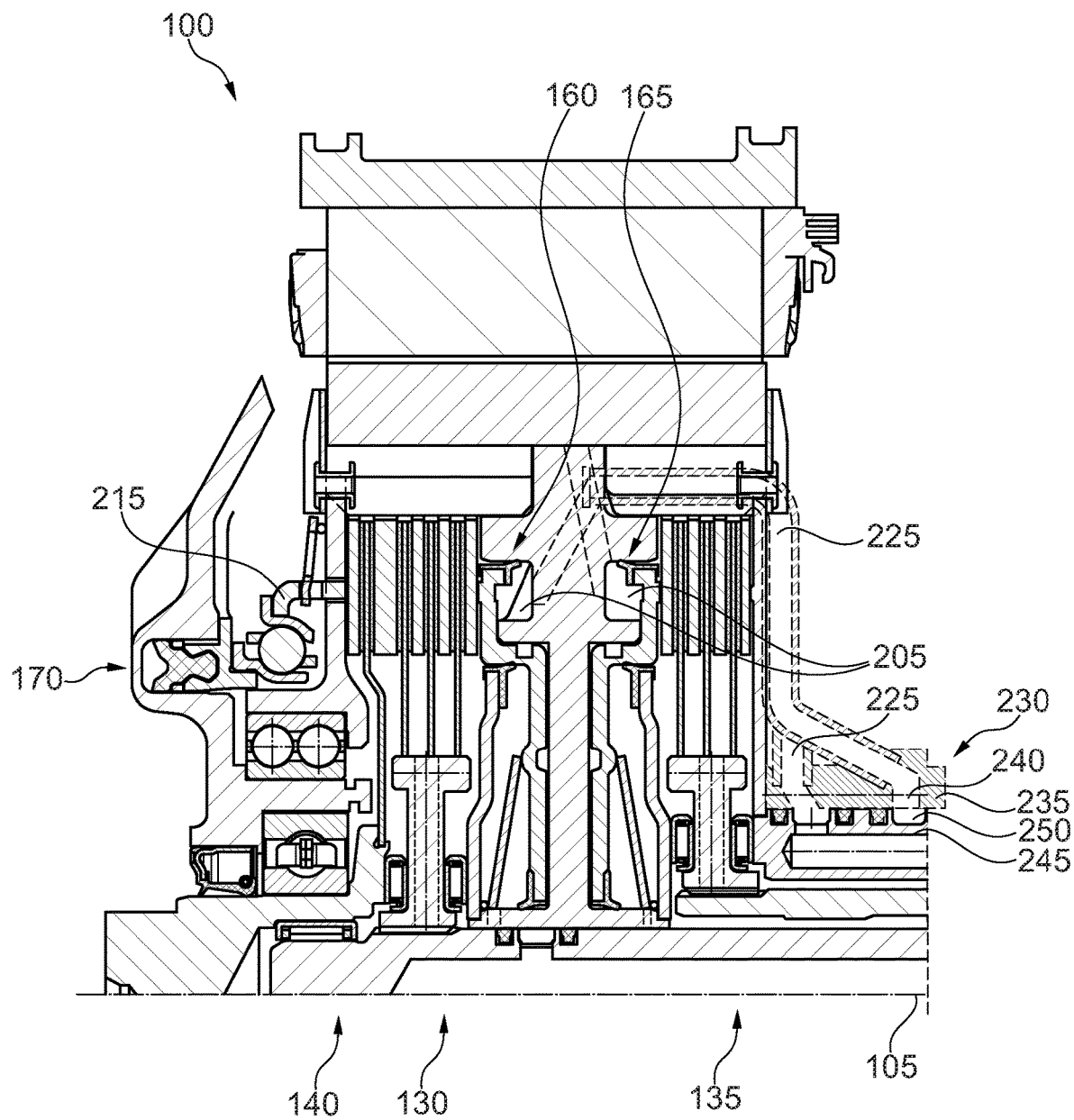
FIG. 4 shows the clutch device of FIG. 1 in an alternative embodiment.

FIG. 4 shows yet another embodiment of the clutch device 100 in FIG. 1. The embodiment illustrated differs from the embodiment shown in FIG. 2 primarily in the routing of the feeds 190 for the actuating devices 160 and 165. Both feeds 190 initially extend radially outward in the flange 185 and, radially to the outside of the second clutch 135, axially to the right. There, the feeds 190 merge into mutually separate lines 225, which are, for example, routed radially inward in a manner offset on a circumference around the axis of rotation 105.

The lines 225, for example, end at a decoupling device 230, which secures hydraulic connections to the lines 225 irrespective of a rotation of the lines 225 around the axis of rotation 105. Essentially, the decoupling device 230 includes a radially outer element 235 having a radial passage 240, which opens into a line 225, and a radially inner element 245 having an annular groove 250, which lie axially opposite the passage 240. This setup is comparable to the routing of hydraulic fluid 180 between the flange 185 and the first output side 120 in the embodiment in FIG. 1.

Figure 5:
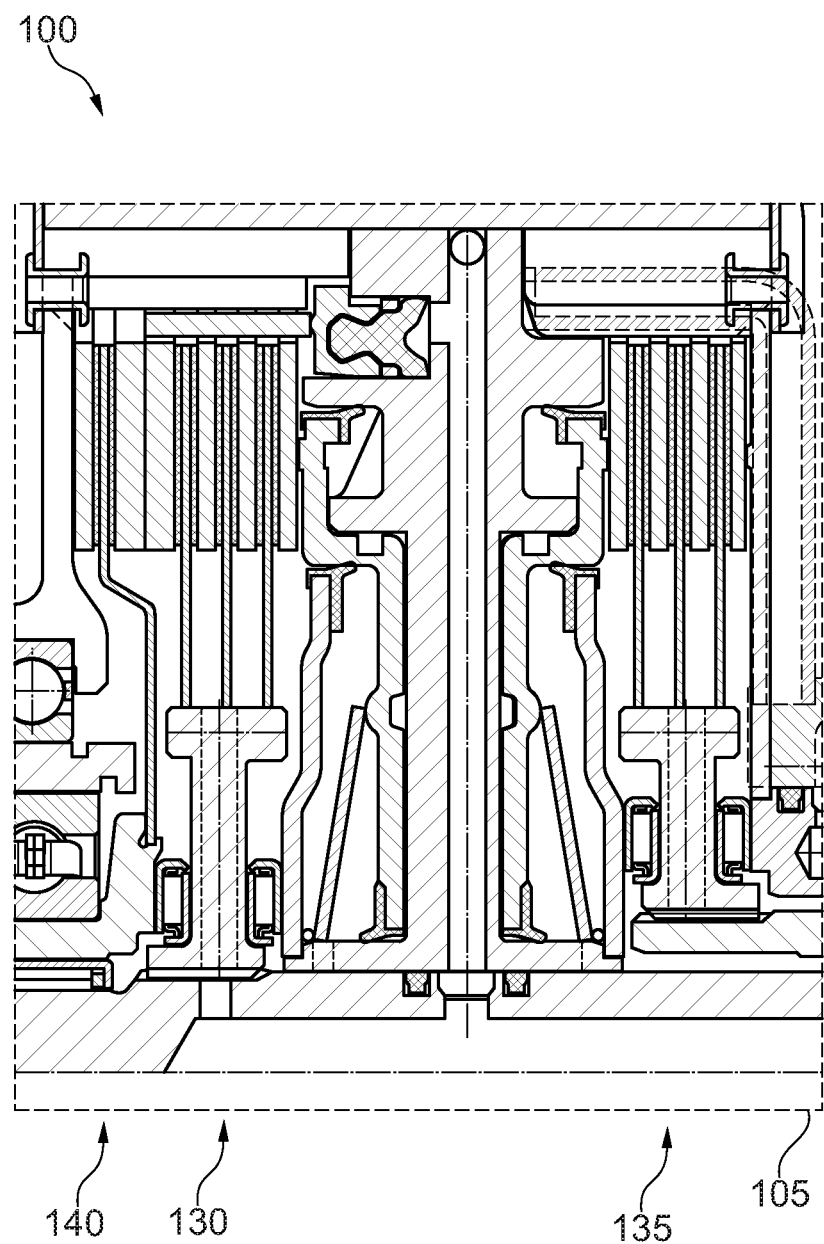
FIG. 5 shows a detail view of the clutch device of FIG. 2.

FIG. 5 shows a detail view of the embodiment shown in FIG. 2.

The features of the above-described embodiments in FIGS. 1 to 5 can be combined individually as desired, as a person skilled in the art of clutch devices will readily recognize.

LIST OF REFERENCE SIGNS 100 clutch device
105 axis of rotation
110 first input side
115 second input side
120 first output side
125 second output side
130 first clutch
135 second clutch
140 third clutch
145 electric machine
150 rotor
155 stator
160 first actuating device
165 second actuating device
170 third actuating device
175 housing
180 liquid medium
185 flange
190 feed
195 hole
205 hydraulic working space
210 elastic element
215 actuating element
220 rolling bearing
222 closure body
225 line
230 decoupling device
235 outer element
240 passage
245 inner element
250 annular groove

The invention claimed is:

1. A clutch device comprising:
an axis of rotation;
a first input side and a second input side each rotatable around the axis of rotation;
a first output side and a second output side each rotatable around the axis of rotation;
a first clutch disposed between the first input side and the first output side, and including a first hydraulic actuating device;
a second clutch disposed between the first input side and the second output side, and including a second hydraulic actuating device;
a third clutch disposed between the first input side and the second input side, and including a third hydraulic actuating device; and,
a radial flange:
comprising a radially extending feed for hydraulic fluid to at least one of the first hydraulic actuating device, the second hydraulic actuating device, and the third hydraulic actuating device; and,
arranged for receiving an axial actuating force of at least one of the first hydraulic actuating device, the second hydraulic actuating device, and the third hydraulic actuating device, wherein:
the first output side or the second output side comprises a shaft having a coaxial hole; and
the radially extending feed opens into the coaxial hole.

2. The clutch device as claimed in claim 1, wherein the first clutch and the second clutch are offset axially relative to one another.

3. The clutch device as claimed in claim 1, wherein the radial flange comprises mutually separate, radially extending feeds to the first hydraulic actuating device and the second hydraulic actuating device.

4. The clutch device as claimed in claim 1, wherein the radially extending feed extends radially outward from at least one of the first hydraulic actuating device, the second hydraulic actuating device, and the third hydraulic actuating device.

5. The clutch device as claimed in claim 1, wherein the radially extending feed extends radially inward from at least one of the first hydraulic actuating device, the second hydraulic actuating device, and the third hydraulic actuating device.

6. The clutch device as claimed in claim 5, wherein:
the radially extending feed is closed on a radial outer side by means of a closure body;
the closure body rests radially on an electric machine; and,
the electric machine is mounted radially outside of the first input side.

7. The clutch device as claimed claim 1, wherein:
the first clutch, the second clutch, and the third clutch are all arranged in a common housing; and,
the common housing is at least partially filled with a liquid medium.

8. The clutch device as claimed claim 1, wherein the first input side is arranged for connection to a rotor of an electric machine.

9. The clutch device as claimed in claim 1, wherein the second input side is arranged for connection to an output shaft of a combustion engine.

10. A clutch device comprising:
an axis of rotation;
a first input side rotatable around the axis of rotation and arranged for connection to an electric machine;
a first output side and a second output side each rotatable around the axis of rotation;
a first clutch for frictionally engaging the first input side to the first output side, the first clutch comprising a first hydraulic actuating device;
a second clutch for frictionally engaging the first input side and the second output side, the second clutch comprising a second hydraulic actuating device; and,
a radial flange comprising a radially extending feed for providing hydraulic fluid to the first hydraulic actuating device or the second hydraulic actuating device, wherein the first output side or the second output side comprises a shaft having a coaxial hole and the radially extending feed opens into the coaxial hole.

11. The clutch device of claim 10, wherein the first clutch and the second clutch are radially aligned and axially offset relative to one another.

12. The clutch device of claim 10, wherein the radially extending feed comprises:
a first radially extending feed to the first hydraulic actuating device; and,
a second radially extending feed to the second hydraulic actuating device.

13. The clutch device as claimed in claim 10, wherein:
the radially extending feed is closed on a radial outer side by means of a closure body;
the closure body rests radially on the electric machine; and,
the electric machine is mounted radially outside of the first input side.

14. The clutch device as claimed claim 10, wherein:
the first clutch and the second clutch are arranged in a common housing; and,
the common housing is at least partially filled with hydraulic fluid.

15. The clutch device of claim 10, further comprising:
a second input side rotatable around the axis of rotation and arranged for connection to a combustion engine; and,
a third clutch for frictionally engaging the second input side to the first input side, the third clutch comprising a third hydraulic actuating device.

16. The clutch device of claim 15, wherein the first clutch, the second clutch, and the third clutch are radially aligned and axially offset relative to one another.

17. The clutch device of claim 15, wherein the radially extending feed comprises:
a first feed to the first hydraulic actuating device;
a second feed to the second hydraulic actuating device; and,
a third feed to the third hydraulic actuating device.

18. The clutch device as claimed claim 15, wherein:
the first clutch, the second clutch, and the third clutch are all arranged in a common housing; and,
the common housing is at least partially filled with hydraulic fluid.

19. A clutch device comprising:
an axis of rotation;
a first input side and a second input side each rotatable around the axis of rotation;
a first output side and a second output side each rotatable around the axis of rotation;
a first clutch disposed between the first input side and the first output side, and including a first hydraulic actuating device;
a second clutch disposed between the first input side and the second output side, and including a second hydraulic actuating device;
a third clutch disposed between the first input side and the second input side, and including a third hydraulic actuating device; and,
a radial flange:
comprising a radially extending feed for hydraulic fluid to at least one of the first hydraulic actuating device, the second hydraulic actuating device, and the third hydraulic actuating device; and,
arranged for receiving an axial actuating force of at least one of the first hydraulic actuating device, the second hydraulic actuating device, and the third hydraulic actuating device, wherein:
the radially extending feed is closed on a radial outer side by means of a closure body;
the closure body rests radially on an electric machine; and,
the electric machine is mounted radially outside of the first input side.

* * * * *